C. K. ERNST.
TRUCK OR PORTABLE TURNTABLE FOR VEHICLES.
APPLICATION FILED MAY 23, 1919.
1,356,198.
Patented Oct. 19, 1920.
2 SHEETS—SHEET 1.
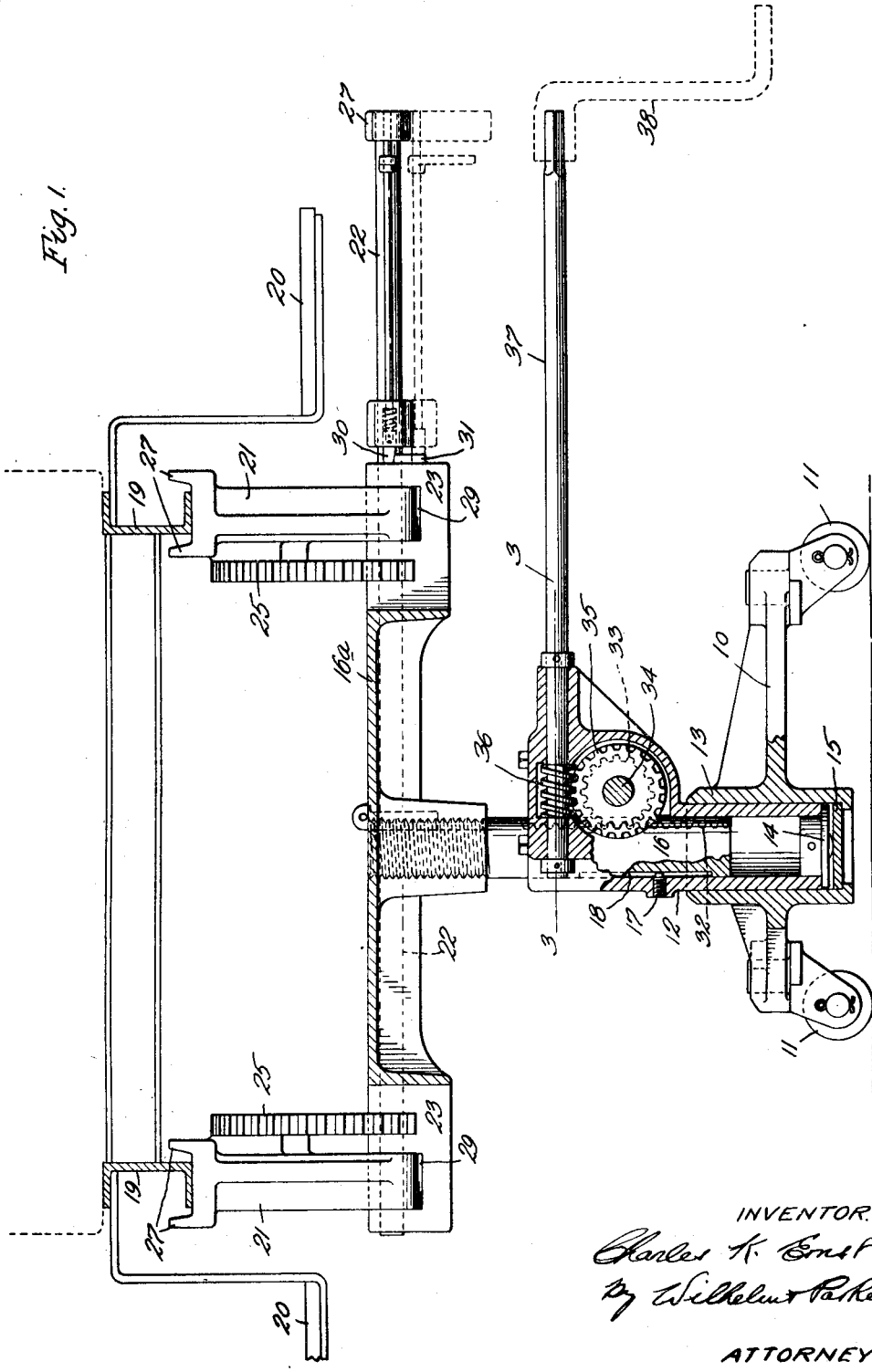
INVENTOR
Charles K. Ernst
By Wilhelm Parker
ATTORNEYS.

C. K. ERNST.
TRUCK OR PORTABLE TURNTABLE FOR VEHICLES.
APPLICATION FILED MAY 23, 1919.
1,356,198.
Patented Oct. 19, 1920.
2 SHEETS—SHEET 2.
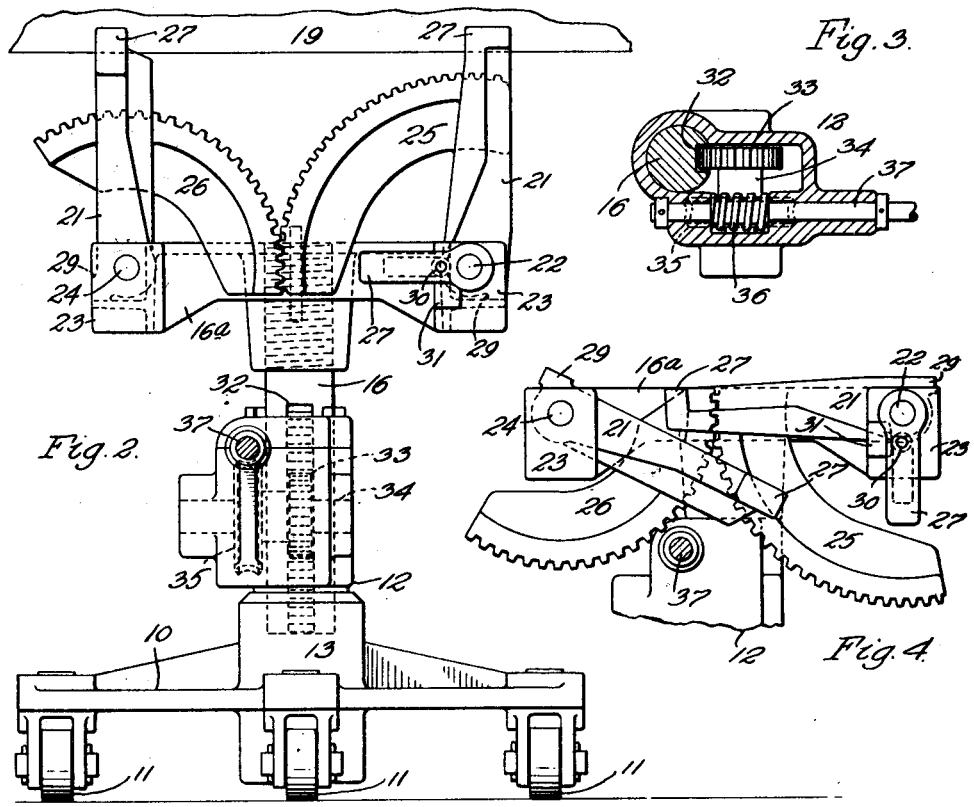
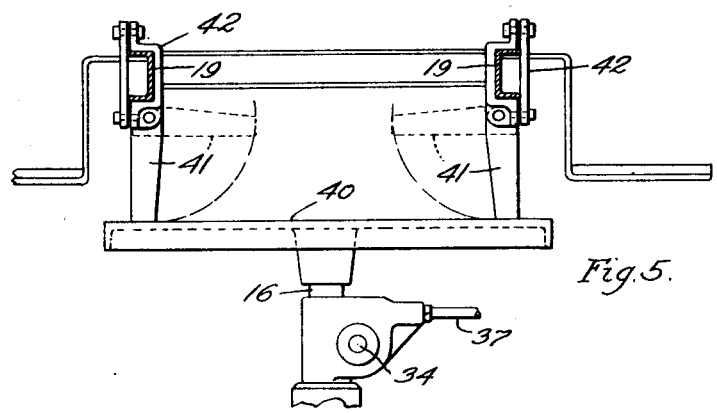
INVENTOR.
Charles K. Ernst,
By Wilhelm Parker
ATTORNEYS.

UNITED STATES PATENT OFFICE.

CHARLES K. ERNST, OF BUFFALO, NEW YORK.

TRUCK OR PORTABLE TURNTABLE FOR VEHICLES.

1,356,198.  Specification of Letters Patent.  Patented Oct. 19, 1920.

Application filed May 23, 1919. Serial No. 299,263.

*To all whom it may concern:*

Be it known that I, CHARLES K. ERNST, a citizen of the United States, residing at Buffalo, in the county of Erie and State of New York, have invented a new and useful Improvement in Trucks or Portable Turntables for Vehicles, of which the following is a specification.

This invention relates to trucks or portable turntables for lifting and turning or shifting the position of vehicles, such as automobiles in garages and other places where there is not room enough to turn the vehicle on the ground or floor. Turntables of a more or less portable nature intended to be placed, for instance, on the floors of private garages for turning the car in the garage have heretofore been contemplated but all of the devices of this sort of which I am aware have been provided with wheel tracks or ways, or are otherwise constructed so that it is necessary to run the automobile up onto the turntable and the automobile rests by its wheels on the turntable. To all practical intents, therefore, such a turntable is a fixture and is not intended nor adapted to be moved to and placed under the vehicle but it is always necessary to move the vehicle to and onto the turntable.

The object of this invention is to provide a practical and desirable portable turntable, truck, or device which is adapted to be rolled or moved about on the ground and can be moved to the automobile or vehicle wherever it may be, placed under the vehicle while it rests on its wheels, and actuated to lift and support the vehicle on the device so as to permit the vehicle to be turned or moved on the truck or device to any desired position.

In the accompanying drawings:

Figure 1 is a transverse sectional elevation of a truck or device embodying the invention.

Fig. 2 is an end elevation, partly in section, thereof.

Fig. 3 is a horizontal section thereof in line 3—3, Fig. 1.

Fig. 4 is a fragmentary end elevation showing the movable rests in their lowered or inoperative position.

Fig. 5 is a sectional elevation showing a slightly modified construction.

The truck or device is provided with casters, rollers, or other means adapting it to be moved about on the ground or floor, and when it is to be used for shifting or turning a vehicle it is rolled or moved beneath the vehicle between the wheels thereof and is then actuated to lift the vehicle, which preferably rests by its chassis frame or other suitable part other than the vehicle wheels, on the elevating support or member of the truck or device. When the elevating support is raised, after placing the truck or device in position beneath the vehicle, the vehicle is lifted off of the ground and is supported on the truck or device and can then be moved about or turned on the truck. The elevating support of the truck or device is preferably mounted to rotate horizontally so that the vehicle can be turned on the truck or device as on a turntable.

The truck or device is preferably constructed as follows:

10 represents a base which is provided with supporting wheels, rollers, or other suitable parts adapted to rest on the ground or floor and permit the truck to be rolled or moved about on the ground or floor. As shown, the base is provided with three swivel casters or wheels 11 disposed in a triangular arrangement and suitably pivoted on the base so that the wheels can roll on the ground and can also swing to turn about vertical pivots to enable the truck or device to be rolled or turned in any desired direction on the ground or floor.

12 represents a horizontally rotatable column or member which is mounted to turn on the base, preferably in a suitable upright bearing 13 on the base. This column is preferably provided at its lower end with an anti-friction step bearing 14 of any suitable construction which bears and is adapted to turn on a bearing plate 15 at the lower end of the bearing 13 so that the column or member 12 is adapted to turn freely on the base. 16 is a post which is arranged to slide vertically up and down in the hollow rotatable column 12 and is held from rotation in the column, or is caused to turn horizontally with the column, by suitable means, such as a screw 17 secured to the hollow column and extending into a vertical groove 18 in one side of the post. The post is provided at its upper end with an extended horizontal head or frame 16ª which is preferably of sufficient dimensions to extend laterally beneath the side bars 19 of the chassis frame of the automobile or vehicle and form a supporting member for the vehicle. When the supporting member 16ᵃ is in its lowermost position, its top is low enough to permit the truck or device to be rolled or moved between the vehicle wheels under the running-boards or steps 20 at the sides of the vehicle to a position in which the truck or device is disposed centrally beneath the vehicle, so that by then raising the supporting member it will engage the frame or other suitable part of the vehicle and lift the vehicle. In the construction shown in Figs. 1–4, the elevating support is provided at the corners of its top frame with four hinged legs or rests 21 adapted to be swung from a horizontal or recumbent position, as shown in Fig. 4, to the upright position beneath the side bars of the vehicle frame, shown in Figs. 1 and 2. The two legs at one end of the top frame are fixed to a horizontal rock shaft 22 journaled in suitable bearings 23 on the supporting member and the other two legs are secured to a parallel rock shaft 24 journaled in suitable bearings at the opposite end of the supporting member. Each of the legs at one side of the supporting member is provided with a gear segment 25 which meshes with a gear segment 26 on the opposite leg, so that when the rock shaft 22 is turned by a handle 27 at its outer end, all four legs will be swung up or down simultaneously. The gear segments 25 attached to one pair of legs are preferably of greater radius than the gear segments attached to the other pair of legs, so that the legs are adapted to lie one beneath the other, as shown in Fig. 4, and to be raised from this position to corresponding upright positions by turning the rock shaft 22. When the legs or rests are in their lowered or recumbent position they do not project above the top of the supporting member 16ᵃ far enough to prevent the truck from being passed under the running boards, but when the rests are swung up to their supporting positions after placing the truck beneath the vehicle they extend practically up to the under sides of the side frame bars 19, so that only a comparatively short upward movement of the supporting member is necessary to lift the vehicle off of the ground. The upper or free ends of the rests are preferably made with side flanges 27 which straddle the frame bars 19 and prevent accidental displacement of the bars from the rests. Shoulders 29 are also preferably provided at the hinged ends of the rests, adapted to engage the supporting member 16ᵃ to limit the upward swing of the rests and hold them rigid when upright. 30 indicates a spring-actuated bolt or latch carried by the rock shaft 22 and adapted to engage a lug or part 31 on the supporting member to releasably retain the legs or rests in their two positions.

When the truck or device is moved beneath the vehicle, it is placed so that the legs or rests 21 will be vertically beneath the side bars 19 of the vehicle frame so that when the legs are raised to the upright position they will stand immediately below the side bars of the frame, adapting the side bars to rest thereon when the supporting member is raised.

Any suitable mechanism can be employed for actuating the supporting member 16ᵃ to raise and lower the vehicle. As shown, the post 16 is provided with a toothed rack 32 meshing with a pinion 33 on a horizontal shaft 34 suitably journaled in the rotatable column 12. Secured to this shaft is a worm wheel 35 with which meshes a worm 36 on an operating shaft 37. The operating shaft is also suitably journaled in the rotatable column and extends out to one side of the truck so that it can be turned by a suitable crank or handle 38 applied to its end. The supporting member 16ᵃ and the vehicle resting thereon can be easily raised and lowered by turning this crank or handle. The shafts 37 and 22 can be utilized as handles for rolling or moving the truck about from place to place.

Other suitable means can, if desired, be utilized instead of the hinged legs 21 on the supporting member of the truck to serve as rests or supports between the supporting member and the frame or other convenient part of the vehicle. For instance, as illustrated in Fig. 5, the elevating support or post 16 of the truck is provided with a flat top or table 40 and legs or rests 41 are hinged to the vehicle by clamps or devices 42 of any suitable sort secured to the frame bars of the vehicle. These rests can be swung down from the positions indicated by dotted lines so as to bear on the top or table of the elevating support.

When the truck or device has been placed beneath the vehicle and actuated to lift the vehicle off of the ground, the vehicle is entirely supported on the rotatable supporting member 16ᵃ and it can be turned on the truck as on a turntable, or the truck with the vehicle supported thereon can be turned or moved about on the ground by its wheels or casters 11.

I claim as my invention:

1. A truck for lifting and moving vehicles, comprising a base constructed to adapt the truck to be moved on the ground beneath a standing vehicle between the wheels thereof, a supporting member mounted to raise and lower on said base, rests for the vehicle means for simultaneously moving said rests to supporting position between said supporting member and parts of the vehicle, and means for raising said supporting member whereby the vehicle is lifted and supported on said rests free from the ground and can be moved by said truck.

2. A truck for lifting and moving vehicles, comprising a base constructed to adapt the truck to be moved on the ground beneath a standing vehicle between the wheels thereof, a supporting member mounted to raise and lower on said base, rests for the vehicle on said supporting member, means for simultaneously moving said rests to supporting position beneath parts of the vehicle, and means for raising said supporting member and rests, whereby the vehicle is lifted and supported on said rests free from the ground and can be moved by said truck.

3. A truck for lifting and moving vehicles, said truck being constructed to be moved on the ground beneath a standing vehicle, and comprising a supporting member mounted to raise and lower, rests for the vehicle, means for simultaneously moving said rests to supporting position between said supporting member and parts of the vehicle, and means for raising said supporting member whereby the vehicle is lifted bodily and supported on said rests free from the ground and can move with said truck.

4. A truck for lifting and moving vehicles, said truck being constructed to be moved on the ground beneath a standing vehicle, and comprising a supporting member including a horizontally disposed head and mounted to raise and lower and turn horizontally, rock shafts mounted on said supporting member, rests fixed on said rock shafts and movable to supporting position between said supporting member and parts of the vehicle, means for actuating said rock shafts whereby said rests are moved to supporting positions between the supporting member and parts of the vehicle and means for raising the horizontal head of said supporting member, whereby the vehicle is lifted bodily and supported by the truck free from the ground and can be turned on said truck.

5. A truck for lifting and moving vehicles, comprising a base, a supporting member mounted on said base to move up and down, rests carried by said supporting member, means for simultaneously moving said rests to and from positions to engage parts of the vehicle, and means for raising and lowering said supporting member, said truck being constructed to adapt it to be moved on the ground beneath a standing vehicle between the wheels thereof.

6. A truck for lifting and moving vehicles comprising a base, a supporting member mounted on said base to move up and down and turn horizontally, rests carried by said supporting member, means for simultaneously moving said rests to and from positions to engage parts of the vehicle, and means for raising and lowering said supporting member, said truck being constructed to adapt it to be moved on the ground beneath a standing vehicle between the wheels thereof.

7. A truck for lifting and moving vehicles comprising a base, a supporting member mounted on said base to move up and down, means for raising and lowering said supporting member, and rests mounted for movement from a substantially horizontal to a vertical position between said supporting member and the vehicle, said truck being constructed to adapt it to be moved on the ground beneath a standing vehicle between the wheels thereof.

8. A truck for lifting and moving vehicles, comprising a base, a supporting member mounted on said base to move up and down, means for raising and lowering said supporting member, and rests pivoted to supporting member and movable to and from positions to engage parts of the vehicle, said truck being constructed to adapt it to be moved on the ground beneath a standing vehicle, between the wheels thereof.

9. A truck for lifting and moving vehicles comprising a base constructed to adapt the truck to be moved on the ground beneath a standing vehicle between the wheels thereof, a supporting member mounted to raise and lower on said base, a pair of shafts mounted for rocking movement on said supporting member, vehicle rests fixed to said shafts and movable to and from vehicle engaging position, means for rocking one of said shafts, means operatively connecting said shafts for connecting in pairs the rests on one shaft with the oppositely disposed rests on the other shaft, whereby rocking movement of one of said shafts will move said rests simultaneously to and from vehicle engaging position, and means for raising and lowering said supporting member.

10. A truck for lifting and moving vehicles, comprising a base, a supporting member mounted to raise and lower on said base, a pair of shafts mounted for rocking movement on said supporting member, vehicle rests mounted on said shafts, gears rigid with said shafts, said gears projecting inwardly whereby the gears on one of said shafts mesh with the gears on the other of said shafts and rocking movement of one of said shafts will move all of said rests simultaneously, and means for raising and lowering said supporting member.

11. A truck for lifting and moving vehicles, comprising a base, a supporting member mounted to raise and lower on said base, a pair of shafts mounted for rocking movement of said supporting member, vehicle rests mounted on said shafts and movable to and from vehicle engaging position, sector gears fixed to said rests, each of the gears mounted on the rests on one shaft being of greater radius than the gears mounted on the rests on the other of said shafts, said gears projecting inwardly from said rests, whereby gears of unequal radii are in mesh and rocking movement of one of said shafts moves said rests simultaneously to and from a recumbent position wherein the rests on one of said shafts are superimposed on the rests on the other of said shafts.

12. A truck for lifting and moving vehicles, comprising a base constructed to adapt the truck to be moved on the ground beneath a standing vehicle between the wheels thereof, a supporting member mounted to raise and lower on said base, a pair of shafts mounted for rocking movement on said supporting member, vehicle rests fixed to said shafts for movement relatively to said supporting member to and from vehicle engaging position, means operatively connecting said shafts, whereby rocking movement of one of said shafts will move said rests simultaneously, a lug on said supporting member, and lug engaging means on one of said shafts whereby said rests may be releasably held against movement relative to said supporting member.

Witness my hand, this 19th day of May, 1919.

CHARLES K. ERNST.

Witnesses:
C. W. PARKER,
A. L. McGEE.

It is hereby certified that in Letters Patent No. 1,356,198, granted October 19, 1920, upon the application of Charles K. Ernst, of Buffalo, New York, for an improvement in "Trucks or Portable Turntables for Vehicles," errors appear in the printed specification requiring correction as follows: Page 3, claim 4, strike out line 30; same page and claim, line 40, strike out the words "the horizontal head of"; and that the said Letters Patent should be read with these corrections therein that the same may conform to the record of the case in the Patent Office.

Signed and sealed this 30th day of November, A. D., 1920.

[SEAL.]

L. B. MANN,

*Acting Commissioner of Patents.*

Cl. 254—6.